United States Patent
Walters et al.

(10) Patent No.: US 10,719,666 B1
(45) Date of Patent: Jul. 21, 2020

(54) COMPUTER-BASED SYSTEMS UTILIZING TEXTUAL EMBEDDING SPACE SOFTWARE ENGINES FOR IDENTIFYING CANDIDATE PHRASES IN A TEXT DOCUMENT AND METHODS OF USE THEREOF

(71) Applicant: Capital One Services, LLC, McLean, VA (US)

(72) Inventors: Austin Walters, Savoy, IL (US); Vincent Pham, Champaign, IL (US); Ernest Kwak, Urbana, IL (US); Galen Rafferty, Mahomet, IL (US); Reza Farivar, Champaign, IL (US); Jeremy Goodsitt, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/778,414

(22) Filed: Jan. 31, 2020

(51) Int. Cl.
G06F 17/28 (2006.01)
G06F 40/35 (2020.01)
(Continued)

(52) U.S. Cl.
CPC ........ G06F 40/35 (2020.01); G06F 16/90344 (2019.01); G06F 40/216 (2020.01);
(Continued)

(58) Field of Classification Search
CPC ........ G06F 40/216; G06F 40/30; G06F 40/35; G06F 40/284; G06F 40/295; G06F 40/40; G06F 40/44; G06F 40/45; G06F 16/3334; G06F 16/353; G06F 16/90332; G06F 16/3347; G06F 16/93; G06F 16/9535; G06F 16/2237; G06F 16/23; G06F 16/2455; G06F 16/2465; G06F 16/26; G06F 16/282; G06F 16/3338; G06F 16/338; G10L 15/26; G10L 15/22; G06N 3/084; G06N 3/006;
(Continued)

(56) References Cited

U.S. PATENT DOCUMENTS

| | | | |
|---|---|---|---|
| 8,626,491 B2 * | 1/2014 | Gattani | G06F 40/295 704/9 |
| 9,143,638 B2 * | 9/2015 | King | H04N 1/00334 |
| 2008/0306725 A1 * | 12/2008 | Moore | G06F 40/44 704/2 |
| 2009/0193011 A1 * | 7/2009 | Blair-Goldensohn | G06F 16/345 |

(Continued)

*Primary Examiner* — Vijay B Chawan
(74) *Attorney, Agent, or Firm* — Greenberg Traurig, LLP

(57) ABSTRACT

A method for identifying phrases in a text document having a similar discourse to a candidate phrase includes separating text in a document file into a plurality of phrases and generating a plurality of embedding vectors in a textual embedding space by inputting the plurality of phrases into an embedding engine. A mapping of each embedding vector in the textual embedding space is generated with each corresponding phrase and a document location of each corresponding phrase in the document file. A candidate phrase is received by a user and a candidate embedding vector is generated using the embedding engine. Similarity scores are computed based on the plurality of embedding space distances between the candidate phrase embedding vector location and each respective location of each embedding vector in the textual embedding space. A listing of phrases with the highest similarity scores are outputted with respective document locations in the text.

20 Claims, 12 Drawing Sheets

(51) Int. Cl.
*G06F 16/903* (2019.01)
*G06N 3/04* (2006.01)
*G06F 40/284* (2020.01)
*G06N 3/08* (2006.01)
*G06F 40/216* (2020.01)
*G06F 40/44* (2020.01)
*G06F 40/45* (2020.01)

(52) U.S. Cl.
CPC ........... *G06F 40/284* (2020.01); *G06N 3/049* (2013.01); *G06N 3/084* (2013.01); *G06F 40/44* (2020.01); *G06F 40/45* (2020.01); *G06N 3/0454* (2013.01)

(58) Field of Classification Search
CPC ........ G06N 3/02; G06N 5/022; G06N 3/0445; G06N 3/0454; G06N 3/04
USPC .......................... 704/9, 10, 2, 4, 5, 7, 8, 257
See application file for complete search history.

(56) References Cited

U.S. PATENT DOCUMENTS

| | | | |
|---|---|---|---|
| 2010/0010968 A1* | 1/2010 | Redlich | G06Q 10/00 707/E17.014 |
| 2010/0250497 A1* | 9/2010 | Redlich | F41H 13/00 707/661 |
| 2013/0103389 A1* | 4/2013 | Gattani | G06F 40/295 704/9 |
| 2015/0200967 A1* | 7/2015 | Redlich | G06Q 10/10 726/1 |
| 2018/0246899 A1* | 8/2018 | Natchu | G06F 16/958 |
| 2018/0246972 A1* | 8/2018 | Shukla | G06F 16/9535 |
| 2018/0268548 A1* | 9/2018 | Lin | G06T 7/11 |
| 2019/0035083 A1* | 1/2019 | Lin | G06N 3/0454 |
| 2019/0102482 A1* | 4/2019 | Ni | G06F 40/35 |
| 2019/0370273 A1* | 12/2019 | Frison | G06F 16/338 |
| 2020/0042611 A1* | 2/2020 | Sparrow | G06N 3/04 |
| 2020/0089709 A1* | 3/2020 | Ni | G06F 40/216 |

* cited by examiner

| Line No. | DOCUMENT |
|---|---|
| 52 | There are many species of foxes belong to the Canidae family. Foxes are closely related to |
| 53 | other canids, such as: dogs, jackals or wolves. .... The red fox or common fox is the most |
| 54 | popular of the fox species. It lives in the northern hemisphere, in mountains, plains, forests, |
| 55 | beaches and even deserts or frozen areas. The red fox eats mainly domesticated fowl, like |
| 56 | chickens... |
| ⋮ | ...... |
| 137 | The arctic fox has a white fur that turns brown during the warmer months. They can be found |
| 138 | throughout the North Pole, from Canada to Siberia. The arctic fox likes to eat rabbit and mice. |
| ⋮ | ..... |
| | ...... |
| 351 | The swift fox is similar to the red fox with an orange brown fur, but smaller in size. They are |
| 352 | commonly found throughout the grasslands of the United States and Canada. The swift fox |
| 353 | likes to eat small animals of the grassland. |
| ⋮ | .... |
| | .... |
| 607 | The fennec fox has a very distinct face with small eyes and large ears. They live in a desert |
| 608 | environment. The fennec fox likes to eat mice and other small animals. |
| ⋮ | .... |
| | .... |
| 736 | The gray fox is not really gray, but their fur can have black and white hairs that together look |
| 737 | gray. In addition, behind their ears there is a red fur. The gray fox is one of the largest fox |
| 738 | species. They may be found throughout all of the Americas from Canada to Venezuela. They |
| 739 | are adapted to also climb trees and can also swim. The grey fox does not like to eat small |
| 740 | mammals, but prefers to eat fish, mollusks and crabs caught in rivers and lakes while |
| 741 | swimming. |
| ⋮ | ...... |
| 877 | The kit fox has a thin and slender body with reddish-gray fur and large ears. It is the smallest |
| 878 | fox species. Kit foxes can be found in prairie areas of the southwestern United States and |
| 879 | Mexico. This fox is both nocturnal and diurnal. The kit fox can forage on fruits, berries, |
| 880 | vegetables, seeds, and fungi. |
| ⋮ | ..... |

FIG. 3

| Distance | Identified Phrase | Line Number in document | Similarity Rank |
|---|---|---|---|
| 36 | The red fox eats mainly domesticated fowl, like chickens | 55 | 1 |
| 120 | The swift fox likes to eat small animals and birds of the grassland. | 352 | 2 |
| 121 | The arctic fox likes to eat rabbit and mice. | 138 | 3 |
| 125 | The fennec fox likes to eat mice and other small animals. | 608 | 4 |
| 220 | The grey fox does not like to eat small mammals, but prefers to eat fish, mollusks and crabs caught in rivers and lakes while swimming. | 739 | 5 |
| 323 | The kit fox can forage on fruits, berries, vegetables, seeds, and fungi. | 879 | 6 |

CANDIDATE SEARCH STRING: THERE WAS A FOX WHO EATS HENS

DOCUMENT: The Big Book of Foxes by Joseph Foxlover

FIG. 6

| Line No. | DOCUMENT |
|---|---|
| 52<br>53<br>54<br>55<br>56<br>⋮ | There are many species of foxes belong to the Canidae family. Foxes are closely related to other canids, such as: dogs, jackals or wolves. .... The red fox or common fox is the most popular of the fox species. It lives in the northern hemisphere, in mountains, plains, forests, beaches and even deserts or frozen areas. *The red fox eats mainly domesticated fowl, like chickens*... |
| 137<br>138<br>⋮ | The arctic fox has a white fur that turns brown during the warmer months. They can be found throughout the North Pole, from Canada to Siberia. *The arctic fox likes to eat rabbit and mice.* |
| 351<br>352<br>353<br>⋮ | The swift fox is similar to the red fox with an orange brown fur, but smaller in size. They are commonly found throughout the grasslands of the United States and Canada. *The swift fox likes to eat small animals of the grassland.* |
| 607<br>608<br>⋮ | The fennec fox has a very distinct face with small eyes and large ears. They live in a desert environment. *The fennec fox likes to eat mice and other small animals.* |
| 736<br>737<br>738<br>739<br>740<br>741<br>⋮ | The gray fox is not really gray, but their fur can have black and white hairs that together look gray. In addition, behind their ears there is a red fur. The gray fox is one of the largest fox species. They may be found throughout all of the Americas from Canada to Venezuela. They are adapted to also climb trees and can also swim. *The grey fox does not like to eat small mammals, but prefers to eat fish, mollusks and crabs caught in rivers and lakes while swimming.* |
| 877<br>878<br>879<br>880 | The kit fox has a thin and slender body with reddish-gray fur and large ears. It is the smallest fox species. Kit foxes can be found in prairie areas of the southwestern United States and Mexico. This fox is both nocturnal and diurnal. *The kit fox can forage on fruits, berries, vegetables, seeds, and fungi.* |

FIG. 7

COMPUTER-BASED SYSTEMS UTILIZING TEXTUAL EMBEDDING SPACE SOFTWARE ENGINES FOR IDENTIFYING CANDIDATE PHRASES IN A TEXT DOCUMENT AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer-based systems utilizing textual embedding space software engine for identifying candidate phrases in a text document and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
  receiving, by a processor, a document file of text;
  separating, by the processor, the text in the document file into a plurality of phrases;
  generating, by the processor, a plurality of embedding vectors in a textual embedding space by inputting the plurality of phrases into an embedding engine;
  wherein each embedding vector in the plurality of embedding vectors in the textual embedding space may correspond respectively to a phrase in the plurality of phrases;
  wherein each embedding vector in the plurality of embedding vectors in the textual embedding space may represent a location in the textual embedding space;
  wherein the location in the textual embedding space may represent:
  (i) at least one word in each corresponding phrase in the plurality of phrases, and
  (ii) a discourse of each corresponding phrase in the plurality of phrases;
  wherein the discourse may be based on the at least one word in each corresponding phrase in the plurality of phrases;
  generating, by the processor, a mapping of each embedding vector in the plurality of embedding vectors in the textual embedding space with each corresponding phrase in the plurality of phrases and a document location of each corresponding phrase in the plurality of phrases in the text of the document file;
  storing, by the processor, the mapping in an index in a non-transient memory;
  receiving, by the processor, an input of a candidate phrase by a user;
  generating, by the processor, a candidate embedding vector representing a candidate phrase location in the textual embedding space by inputting the candidate phrase into the embedding engine;
  computing, by the processor, a plurality of embedding space distances between the candidate phrase location and each respective location of each embedding vector in the plurality of embedding vectors in the textual embedding space;
  computing, by the processor, a plurality of similarity scores based on the plurality of embedding space distances;
  ranking, by the processor, the plurality of similarity scores from a highest similarity score to a lowest similarity score; and
  outputting, by the processor, a listing of phrases from the plurality of phrases with the highest similarity scores to the user with respective document locations in the text of the document file based on the mapping index.

In some embodiments, the present disclosure provides an exemplary technically improved computer-based system that includes at least the following components of a non-transient memory and a processor. The processor may be configured to:
  receive a document file of text;
  separate the text in the document file into a plurality of phrases;
  generate a plurality of embedding vectors in a textual embedding space by inputting the plurality of phrases into an embedding engine;
  wherein each embedding vector in the plurality of embedding vectors in the textual embedding space may correspond respectively to a phrase in the plurality of phrases;
  wherein each embedding vector in the plurality of embedding vectors in the textual embedding space may represent a location in the textual embedding space;
  wherein the location in the textual embedding space may represent:
  (i) at least one word in each corresponding phrase in the plurality of phrases, and
  (ii) a discourse of each corresponding phrase in the plurality of phrases;
  wherein the discourse may be based on the at least one word in each corresponding phrase in the plurality of phrases;
  generate a mapping of each embedding vector in the plurality of embedding vectors in the textual embedding space with each corresponding phrase in the plurality of phrases and a document location of each corresponding phrase in the plurality of phrases in the text of the document file;
  store the mapping in an index in the non-transient memory;
  receive an input of a candidate phrase by a user;
  generate a candidate phrase embedding vector representing a candidate phrase location in the textual embedding space by inputting the candidate phrase into the embedding engine;

compute a plurality of embedding space distances between the candidate phrase location and each respective location of each embedding vector in the plurality of embedding vectors in the textual embedding space;

compute a plurality of similarity scores based on the plurality of embedding space distances;

rank the plurality of similarity scores from a highest similarity score to a lowest similarity score; and output a listing of phrases from the plurality of phrases with the highest similarity scores to the user with respective document locations in the text of the document file based on the mapping index.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 is an exemplary screen view of an exemplary document file for identifying phrases having a similar discourse to a candidate phrase, in accordance with one or more embodiments of the present disclosure;

FIG. 6 is an exemplary screen view for outputting identified phrases in a text document having a similar discourse to a candidate phrase, in accordance with one or more embodiments of the present disclosure;

FIG. 7 is an exemplary screen view for highlighting identified phrases in a text document having a similar discourse to a candidate phrase, in accordance with one or more embodiments of the present disclosure;

DETAILED DESCRIPTION

Figure 1:
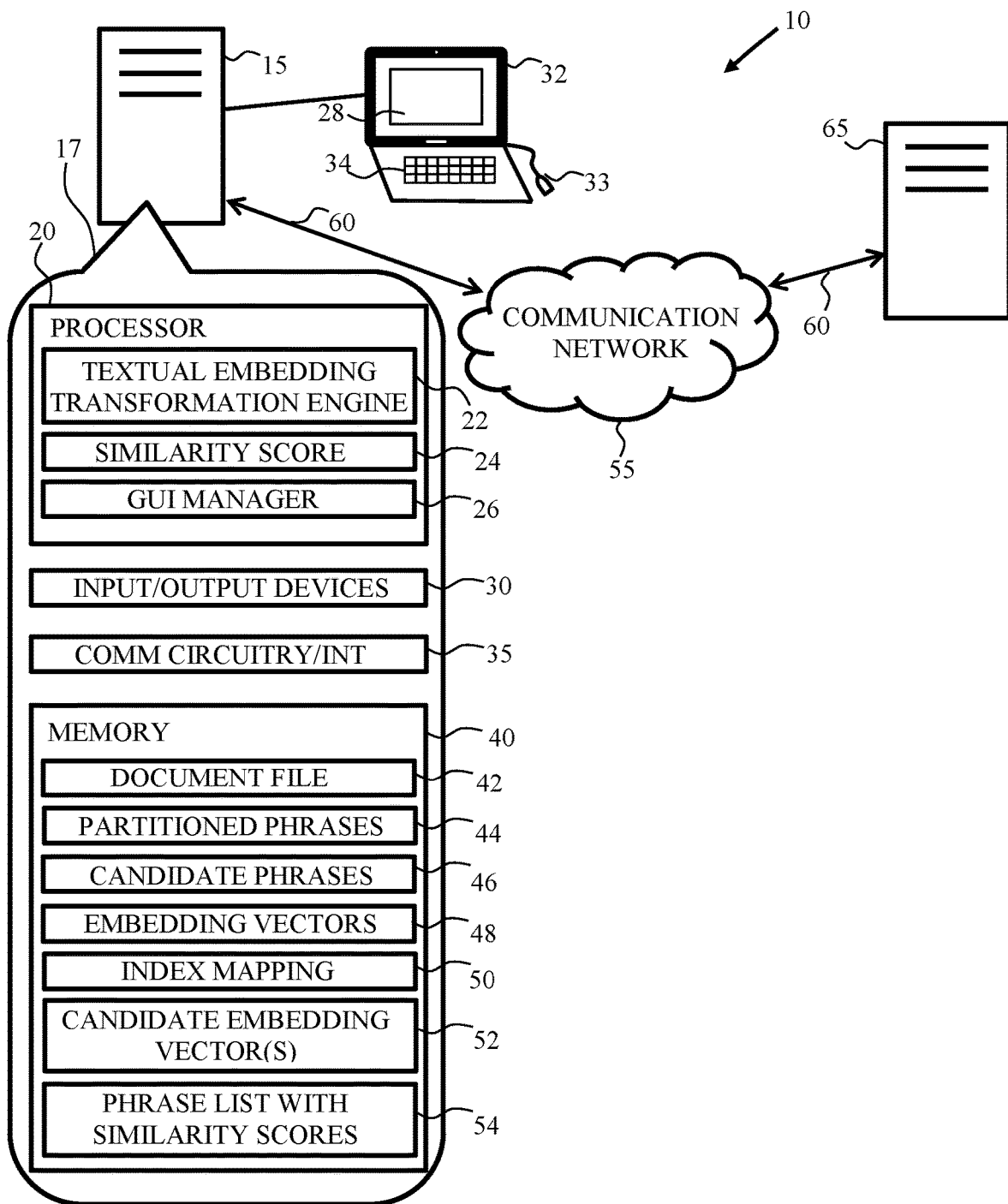
FIG. 1 is a block diagram of an exemplary computer-based system for identifying phrases in a text document having a similar discourse to a candidate phrase using a textual embedding space engine, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

A user may want to obtain and/or locate textual information in a large document file. The user may remember the general semantic context and/or discourse of the desired textual information, but may not remember exact words or phrases in which to perform a text search for locating the desired textual information in the large document file, such as of a book, or a corpus. To search for the desired textual information, the user may perform arbitrary keyword and/or key phrase searches in the document file, for example, using words and/or phrases that user thinks may be in the text of the desired textual information in the document file. In this manner of arbitrary keyword and/or key phrase searches, the searches may be extremely long and tedious, the user may not find the desired textual information in the large document file.

Embodiments of the present disclosure herein describe a system and method for identifying phrases in a text document having a similar discourse to a candidate phrase by use of machine learning techniques. The system may be configured to receive the document file and to separate the text in the document into a plurality of phrases such as sentences, for example. The plurality of phrases may be input into a machine learning algorithm, such as trained neural network model, that may be configured to map each of the words and/or phrases of words in the plurality of phrases and/or the discourse of the plurality of phrases into a respective plurality of embedding vectors in an n-dimensional textual embedding space.

In some embodiments, the user may input into the system, a candidate phrase, which captures the general semantic context and/or discourse of the desired textual information that the user may search for in the document file. The machine learning algorithm may map the candidate phrase into a candidate embedding vector in the n-dimensional textual embedding space. A plurality of distances between the location of candidate embedding vector and each of the plurality of embedding vectors may be computed.

In some embodiments, similarity scores based on the computed distances in the n-dimensional textual embedding space may be assigned to each of the plurality of distances. A higher similarity score or alternatively, a smaller computed distance may be indicative of phrases in the plurality of phrases having a similar semantic context and/or discourse as the candidate phrase inputted by the user. The distances and/or similarity scores may be ranked. The identified phrases of text in the document having the highest similarity scores or smallest computed distances in the textual embedding space relative to the candidate phrase may be outputted to the user.

FIG. 1 is a block diagram of an exemplary computer-based system 10 for identifying phrases in a text document having a similar discourse to a candidate phrase using a textual embedding space engine, in accordance with one or more embodiments of the present disclosure. System 10 may include a computer 15, such as a server, communicating 60 over a communication network 55 with any number of remote computers 65. As shown in inset 17, computer 15 may include a processor 20, input/output devices 30, a non-volatile memory 40, and communication circuitry/interface 35 for communicating 60 over communication network 55. Input/output devices 30 may include a display 32 on which a graphic user interface 28 may be displayed, a keyboard 34 and/or a mouse 33.

In some embodiments, processor 20 may be configured to execute code, which may include a textual embedding transformation engine 22 (e.g., the machine learning algorithm) for identifying phrases in the plurality of phrases having a similar semantic context and/or discourse as the candidate phrase, a similarity score module 24 for assigning and ranking similarity scores and/or distances for each of the identified phrases, and a graphic user interface (GUI) manager 26 which causes display 32 to display GUI 28.

In some embodiments, memory 40 may be configured to store, such as in a database, for example, a document file 42, a plurality of phrases 44 that were separated from document file 42, at least one candidate phrase(s) 46 entered by a user, a plurality of embedding vectors 48 based on document file 42, an index mapping 50 relating each of the plurality of embedding vectors 48 to a location (e.g., a sentence number) in document file 42, at least one candidate embedding vector(s) 52, and a list 54 of identified phrases with similarity scores.

Figure 2:
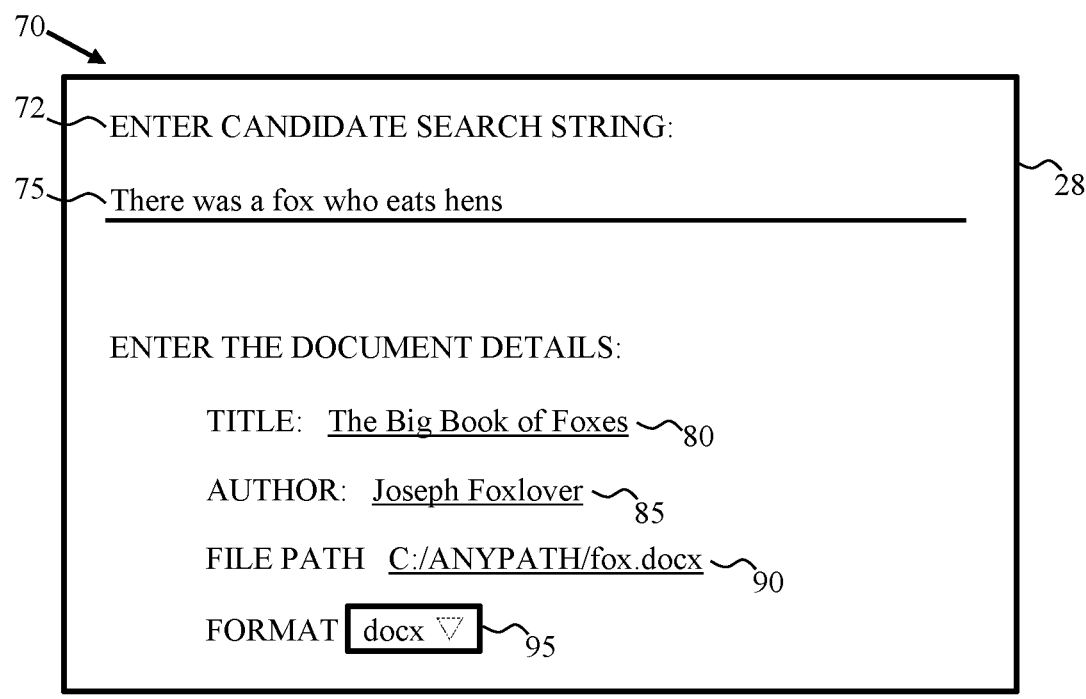
FIG. 2 is an exemplary screen view for inputting a candidate phrase, in accordance with one or more embodiments of the present disclosure.

FIG. 2 is an exemplary screen view 70 for inputting a candidate phrase 75, in accordance with one or more embodiments of the present disclosure. Exemplary screen view 70 may be displayed for example on GUI 28 on display 32. Exemplary screen view 70 many include a prompt 72 to enter candidate search string (e.g., candidate phrase 75), and a prompt 77 to enter document details such as, for example, a title 80, an author 85, a file path to where document file 42 may be stored, and a pull-down menu 95 of the format of the document file.

An exemplary embodiment described hereinbelow to illustrate the method for identifying phrases in a text document having a similar discourse to a candidate phrase uses a fictitious book entitled "The Big Book of Foxes" by the author Joseph Foxlover. The fictitious book may have 500 pages, which may include details on every species in the world on foxes, for example. A user may wish to know what kind of fox eats hens, or similar fowl, but does not have the time to read and/or search 500 pages. The user using system 10 enters candidate phrase 75 "There was a fox who eats hens" into GUI 28 displaying exemplary screen view 70. The exemplary embodiments shown in the disclosure throughout are merely for conceptual clarity and not by way of limitation of the exemplary embodiments of the present disclosure.

FIG. 3 is an exemplary screen view 100 of an exemplary document file 90 for identifying phrases having a similar discourse to candidate phrase 72, in accordance with one or more embodiments of the present disclosure. FIG. 3 shows selected excerpts from exemplary document file 90 (e.g., "The Big Book of Foxes") which is indexed by line numbers 105. Processor 20 using textual embedding transformation engine 22 may be used to partition the document into a plurality of phrases, such as sentences, identified by delimiters in the text of exemplary document file 90, for example. Textual embedding transformation engine 22 may generate a plurality of embedding vectors in the textual embedding space for each sentence or phrase separated from the text in document file 90, and a candidate embedding vector based on candidate phrase 75.

In some embodiments, the machine learning algorithm may map sentences into an n-dimensional textual embedding space. The n-dimensional textual embedding space may also be referred to as a sentence embedding space, or a discourse-based sentence embedding space. Each of the plurality of phrases or sentences may be represented as an n-dimensional embedding vector in the textual embedding space. Furthermore, each embedding vector may include an array of numbers representing coordinates of a location in the n-dimensional textual embedding space where each location may correspond to words, combinations of words, a discourse of the words of the phrase, or any combination thereof.

In some embodiments, the discourse may represent "what is being talked about" in the phrase. For example, the phrases "a fox eats a hen" and "a fox does not eat a hen" has the same words "fox" "eat" and "hen". However, the word "not" changes the discourse of the sentence, for example. In other embodiments, the embedding vector may be a word vector, a discourse vector, or a combination of the two in the n-dimensional textual embedding space.

In some embodiments, values of the numbers used in the n-elements of the n-dimensional embedding vector may represent a word, relationships between words, and/or a discourse in the phrase where the values of the numbers are based on the machine learning model used.

In some embodiments, any of the plurality of embedded vectors in the textual embedding space may be a superposition of any combination of word vectors and/or discourse vectors in the n-dimensional textual embedding space. A word vector may capture lexical and/or semantic properties of a word in a given phrase or sentence when mapped into the textual embedding space. The discourse of a sentence or phrase may be mapped using the machine learning model into a discourse vector in the n-dimensional textual embedding space representing what is being talked about in the given phrase or sentence.

In some embodiments, the same machine learning model may be used to map each phrase or sentence in the document file and the candidate phrase to respective embedding vectors in the n-dimensional textual embedding space. When the distance is zero for any one of the phrases in the document file, the phrase and the candidate phrase having the same distance between them are substantially identical phrases. In this case, the phrase may be nearly word-for-word identical to the candidate phrase, such as different by 2-5 word, for example, and still have zero distance in the n-dimensional textual embedding space.

In some embodiments, similarity score module 24 may compute similarity scores for each of the identified phrases using any suitable formula based on the distance where a higher similarity score is indicative of a phrase having a better match to the candidate phrase. In other embodiments, a smallest computed distance may be used to indicate to a user that an identified phrase in the document has the best match to the user-defined candidate phrase, and subsequently ranked.

In some embodiments, the embedding vectors may be generated using elements in the textual embedding space selected from the group consisting of: word embeddings associated with each of the at least one word in each corresponding phrase in the plurality of phrases, word vectors associated with each of the at least one word in each corresponding phrase in the plurality of phrases, weighted averages of word vectors, and a discourse vector capturing correlations between word vectors of the at least one word and the discourse in each corresponding phrase in the plurality of phrases.

In some embodiments, processor 20 may compute the distance between the candidate embedding vector and each of the plurality of embedding vectors in the textual embedding space using a Euclidean (geometrical), Minkowski, Manhattan, and/or Levenshtein distance in n-space, for example. Processor 20 may identify phrases in the exemplary text document when their respective embedding vectors have the smallest distance in the textual embedding space indicating a similar words and/or discourse with the exemplary candidate phrase (e.g., "There was a fox who eats hens" in the exemplary case). Conversely, processor 20 may identify that the phrases "There was a fox who eats hens" to "There are many species of foxes belonging to the Canidae family" (line 52) are not similar having computed a large distance between them in the textual embedding space.

In some embodiments, processor 20 may identify that in document 90, phrase 110 "The red fox eats mainly domesticated fowl, like chickens", phrase 115 "The arctic fox likes to eat rabbit and mice", phrase 120 "The swift fox likes to eat small animals of the grassland", phrase 125 "The fennec fox likes to eat mice and other small animals", phrase 130 "The grey fox does not like to eat small mammals, but prefers to eat fish, mollusks and crabs caught in rivers and lakes while swimming", and phrase 135 "The kit fox can forage on fruits, berries, vegetables, seeds, and fungi" are similar semantically and in discourse to candidate phrase 75 "there was a fox who eats hens" in this exemplary embodiment. This is further discussed in FIGS. 4-5 below.

Figure 4:
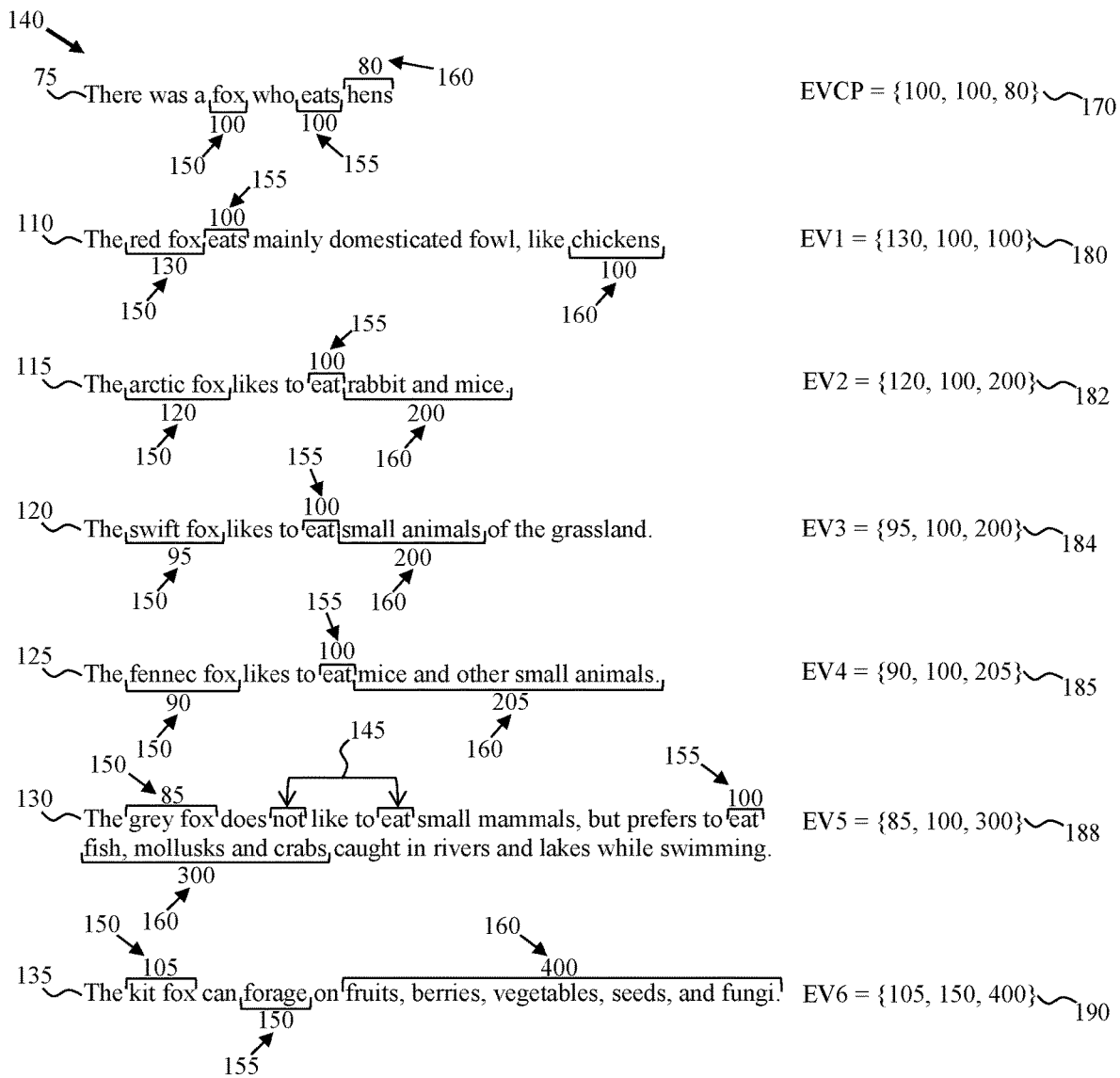
FIG. 4 shows exemplary identified phrases in a document file having a similar discourse to a candidate phrase, in accordance with one or more embodiments of the present disclosure.

FIG. 4 shows exemplary identified phrases 140 in document file 90 having a similar discourse to a candidate phrase, in accordance with one or more embodiments of the present disclosure. Semantically, identified phrases 140 may include 1) an animal like a fox and more specifically, a type of fox, but it could be a lion, tiger, shark, snake, (e.g., a predator); 2) a type of food for the animal such as domesticated fowl (chicken, hens), small animals such as rabbits and mice, aquatic animals (fish, mollusks, and crabs); and 3) the animal "eats" the food, or the animal "forages" for the food (e.g., as being similar acts).

In the exemplary embodiment shown in FIG. 4, a value 150 in the textual embedding space may relate to different types of foxes (e.g. predator), a value 155 may relate to how the predator obtains and/or ingest the food (e.g., "eats" or "forages" in the exemplary embodiments shown in FIG. 4), and a value 160 may relate to a type of food. For candidate phrase 75 and for each of the exemplary phrases in document file 90, a 3-dimensional exemplary vector in the form {type of animal, "eats" or "forages", food} may be constructed to conceptually illustrate the process of mapping between phrases of words to embedding vectors in a textual embedding space. "eats" may assigned a value of 100 in the textual embedding space and "forages" a value of 150, for example.

Accordingly, exemplary three-dimensional embedding vectors (EV) such as EV for candidate phrase EVCP 170, EV1 180, EV2, 182, EV3 184, EV4 186, EV5 188 and EV6 for each of exemplary identified phrases 140 and candidate phrase 75 are shown in FIG. 4. These numerical values are based on the exemplary mapping shown in FIG. 5 below.

Note that in phrase 130, the use of "not" and "eat" shown by an arrow 145 may completely change the discourse of phrase 130. The "grey fox" does "not" like to "eat" "small mammals", but prefers to "eat" "fish, mollusk, and crabs". In this case, embedded vector 188 considers "fish, mollusk, and crabs" as the food for the "grey fox" and not the "small mammals".

Figure 5:
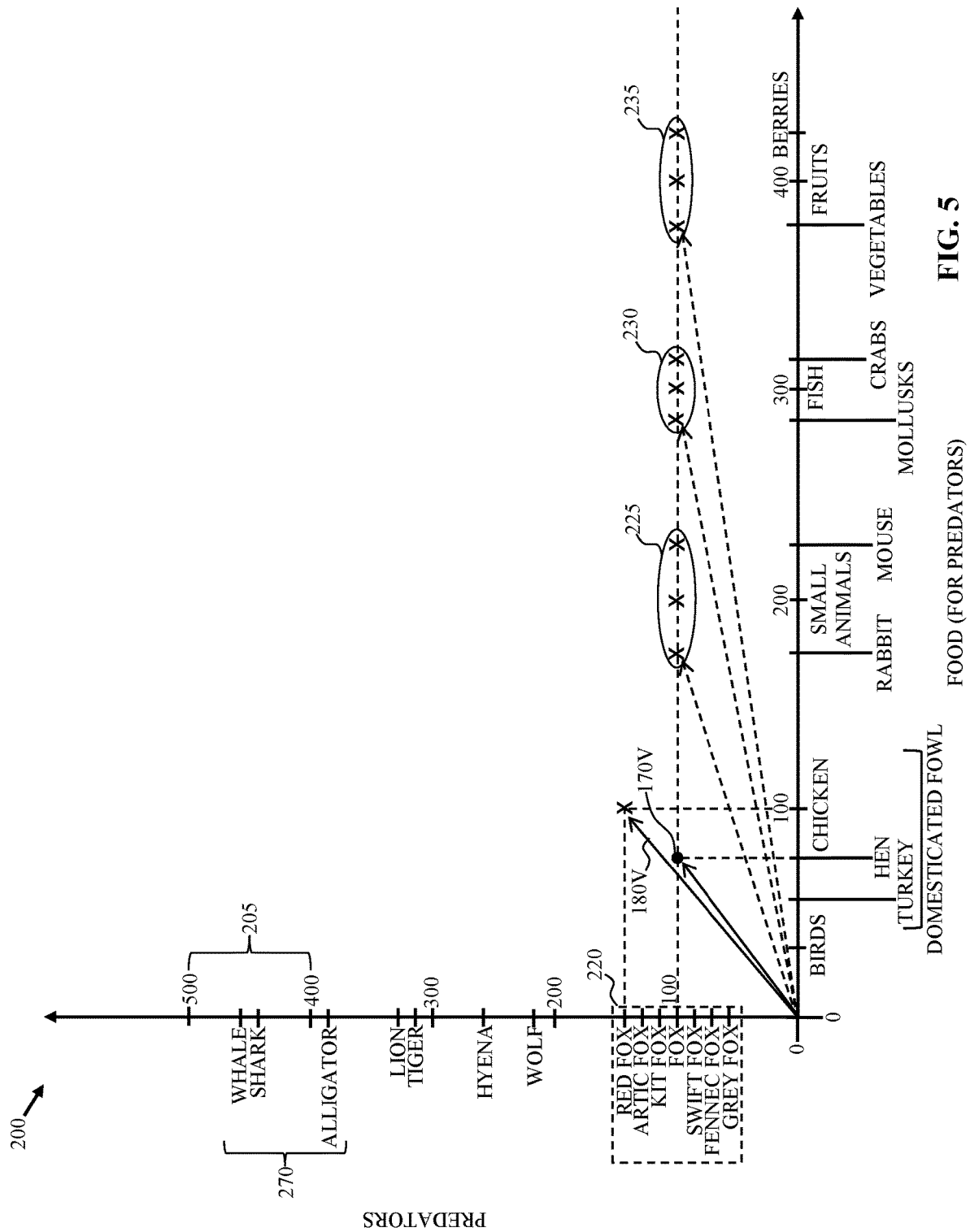
FIG. 5 illustrates an exemplary mapping between phrases of words to embedding vectors in a textual embedding space, in accordance with one or more embodiments of the present disclosure.

FIG. 5 illustrates an exemplary mapping 200 between phrases of words to embedding vectors in a textual embedding space, in accordance with one or more embodiments of the present disclosure. The exemplary two-dimensional mapping is a plot showing predator animal vs. food and a subset of the three-dimensional mapping shown in FIG. 4. Various predator animals may be shown in the vertical axis, such as fox, wolf, lion/tiger, alligator, shark/whale, for example, with corresponding numerical values for those vector elements ranging from 0-500. In a dotted box 220 illustrates the values for the different types of fox center around fox=100, red fox=130 and grey fox=85, whereas lion=320 and alligator=400 have numerical values far from 100. Similarly, on the food axis, turkey=80 and chicken=100, fish=300, and fruits=400.

A vector 170V illustrates a two-dimensional projection of candidate embedding vector 180 of candidate phrase 175 in the predator animal-food plane shown in FIG. 5. A vector 180V two-dimensional projection of embedding vector 180 for identified phrase 180 has the closest distance to vector 170V in the predator animal-food plane. The exemplary values for the animals (predators) and food in exemplary mapping 200 of FIG. 5 were used in the embedding vectors of FIG. 4. A vector 225 may relate to foxes that eat small animals, rabbits, or mice (e.g., identified phrases 115, 120, and 125). A vector 230 may relate to foxes that eat fish, crabs and mollusks (e.g., identified phrase 130). A vector 235 may relate to a fox that eats or forages on fruits, vegetables and berries.

Note that the exemplary embedding vectors and mappings shown in FIGS. 4 and 5 are merely for conceptual clarity, and not by way of limitation of the exemplary embodiments shown herein. A machine learning model trained over a large number of documents may be used to generate the embedded vectors over n-dimensions. Given that the English Oxford English Dictionary includes 171,476 words in current use and 47,156 obsolete words, the actual dimension of the n-dimensional textual embedding space may be even much larger when the mapping may include the discourse of the sentences or phrases in the sentence embeddings.

In some embodiments, the machine learning model may include, for example, a neural network model such as a bidirectional encoder representations from transformers (BERT) model, a convolutional neural network model, and/or a recurrent neural network model. The BERT model may generate embedded vectors that may use a weighted sum of word vectors in the phrase itself. Additionally, the BERT model may output a word vector based on the discourse. For example, the word "cell" in "blood cell" may have a different word vector than "cell" in "prison cell".

FIG. 6 is an exemplary screen view 250 for outputting identified phrases 260 in text document 90 having a similar discourse to a candidate phrase, in accordance with one or more embodiments of the present disclosure. Exemplary screen view 250 on GUI 28 may be displayed on screen 32, for example. Exemplary screen view 250 may include each of identified phrases 260 with the closest discourse to candidate phrase 75 ranked by a similarity rank 270. It should be noted that when textual embedding transformation engine 22 compares all sentences in document file 90 to candidate phrase 75, only the phrases with the smallest distances in textual embedding space may be displayed to the user.

FIG. 7 is an exemplary screen view 300 for highlighting identified phrases in text document 90 having a similar discourse to candidate phrase 75, in accordance with one or more embodiments of the present disclosure. Exemplary screen view 300 on GUI 28 may be displayed on screen 32, for example. Exemplary screen view 250 may include highlighting all identified phrases 260 in document 90, such as a first highlighted phrase 310, a second highlighted phrase 315, a third highlighted phrase 320, a fourth highlighted phrase 325, a fifth highlighted phrase 330, and a sixth highlighted phrase 335. In this manner, the user may then identify the exact textual information that the user wanted to search for in the text of document file 90 without having to perform time consuming hit-or-miss keyword or key phrase searches in the document file.

The embodiments disclosed herein provide a technical solution to the technical problem of rapidly identifying phrases in a very large corpus or text document with multiple repeating words, such as fox, for example, in the exemplary embodiments shown in the previous figures, that have similar lexical and/or semantic and/or discourse properties to a candidate phrase, and displaying the identified phrases to a user.

Figure 8:
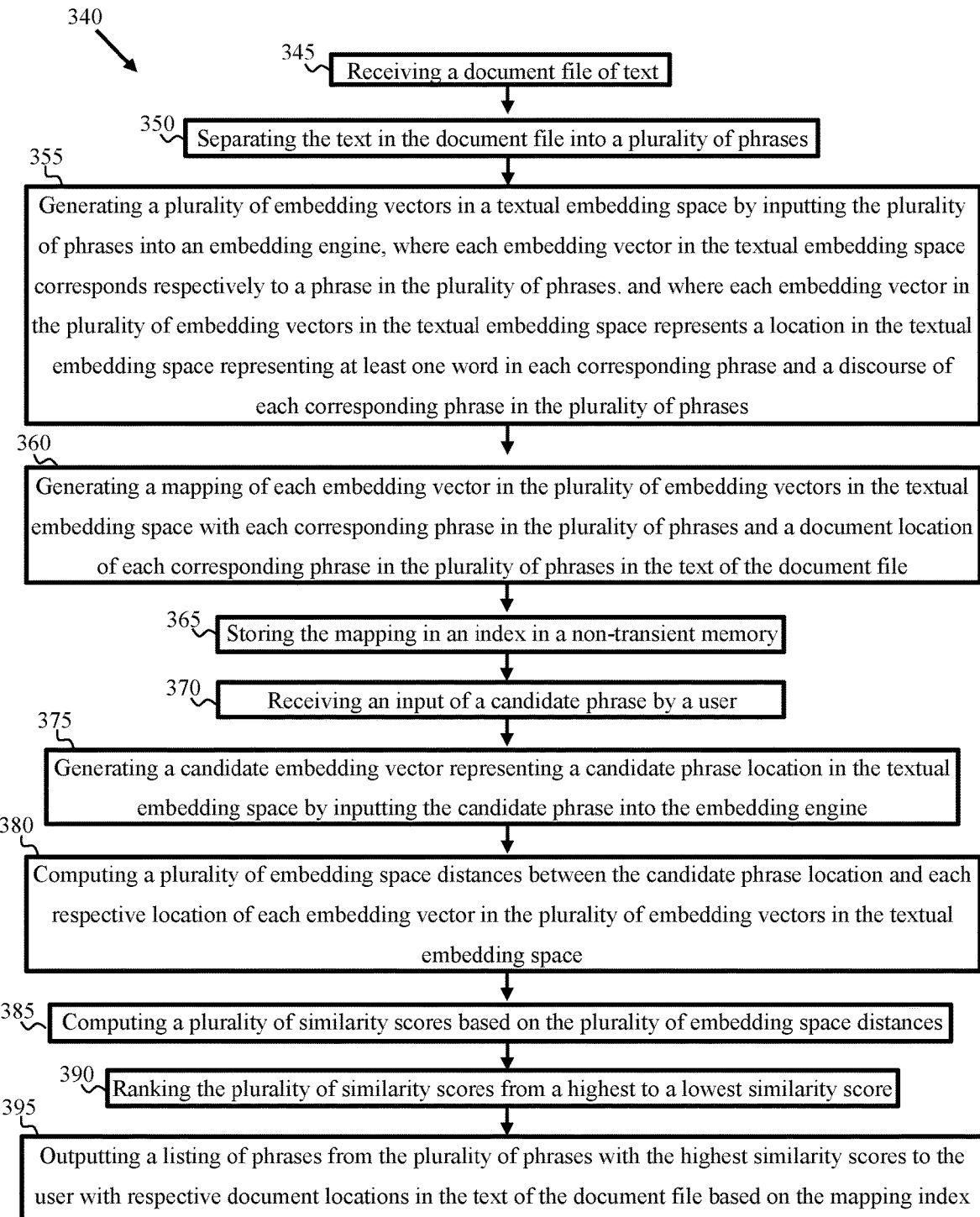
FIG. 8 illustrates a flowchart of an exemplary method for identifying phrases in a text document having a similar discourse to a candidate phrase using a textual embedding space engine, in accordance with one or more embodiments of the present disclosure.

FIG. 8 illustrates a flowchart of an exemplary method 340 for identifying phrases in a text document having a similar discourse to a candidate phrase using a textual embedding space engine, in accordance with one or more embodiments of the present disclosure. Method 340 may be performed by processor 20. Method 340 may include receiving 345 a document file of text.

Method 340 may include separating 350 the text in the document file into a plurality of phrases.

Method 340 may include generating 355 a plurality of embedding vectors in a textual embedding space by inputting the plurality of phrases into an embedding engine, where each embedding vector in the textual embedding space corresponds respectively to a phrase in the plurality of phrases, and where each embedding vector in the plurality of embedding vectors in the textual embedding space represents a location in the textual embedding space representing at least one word in each corresponding phrase and a discourse of each corresponding phrase in the plurality of phrases.

Method 340 may include generating 360 a mapping of each embedding vector in the plurality of embedding vectors in the textual embedding space with each corresponding phrase in the plurality of phrases and a document location of each corresponding phrase in the plurality of phrases in the text of the document file.

Method 340 may include storing 365 the mapping in an index in a non-transient memory.

Method 340 may include receiving 370 an input of a candidate phrase by a user.

Method 340 may include generating 375 a candidate embedding vector representing a candidate phrase location in the textual embedding space by inputting the candidate phrase into the embedding engine.

Method 340 may include computing 380 a plurality of embedding space distances between the candidate phrase location and each respective location of each embedding vector in the plurality of embedding vectors in the textual embedding space.

Method 340 may include computing 385 a plurality of similarity scores based on the plurality of embedding space distances.

Method 340 may include ranking 390 the plurality of similarity scores from a highest to a lowest similarity score.

Method 340 may include outputting 395 a listing of phrases from the plurality of phrases with the highest similarity scores to the user with respective document locations in the text of the document file based on the mapping index.

In some embodiments, processor 20 may improve the algorithmic search time for identifying phrases in a text document having a similar discourse to a candidate phrase by processor 20 applying a data structure, such as a k-dimensional, or K-d, tree data structure, for example. In some embodiments, processor 20 may partition the textual embedding space into quadrants and search within one of the quadrants, such as the quadrant in which the candidate embedded vector is located, to identify the phrases in the text document having a similar discourse.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 9:
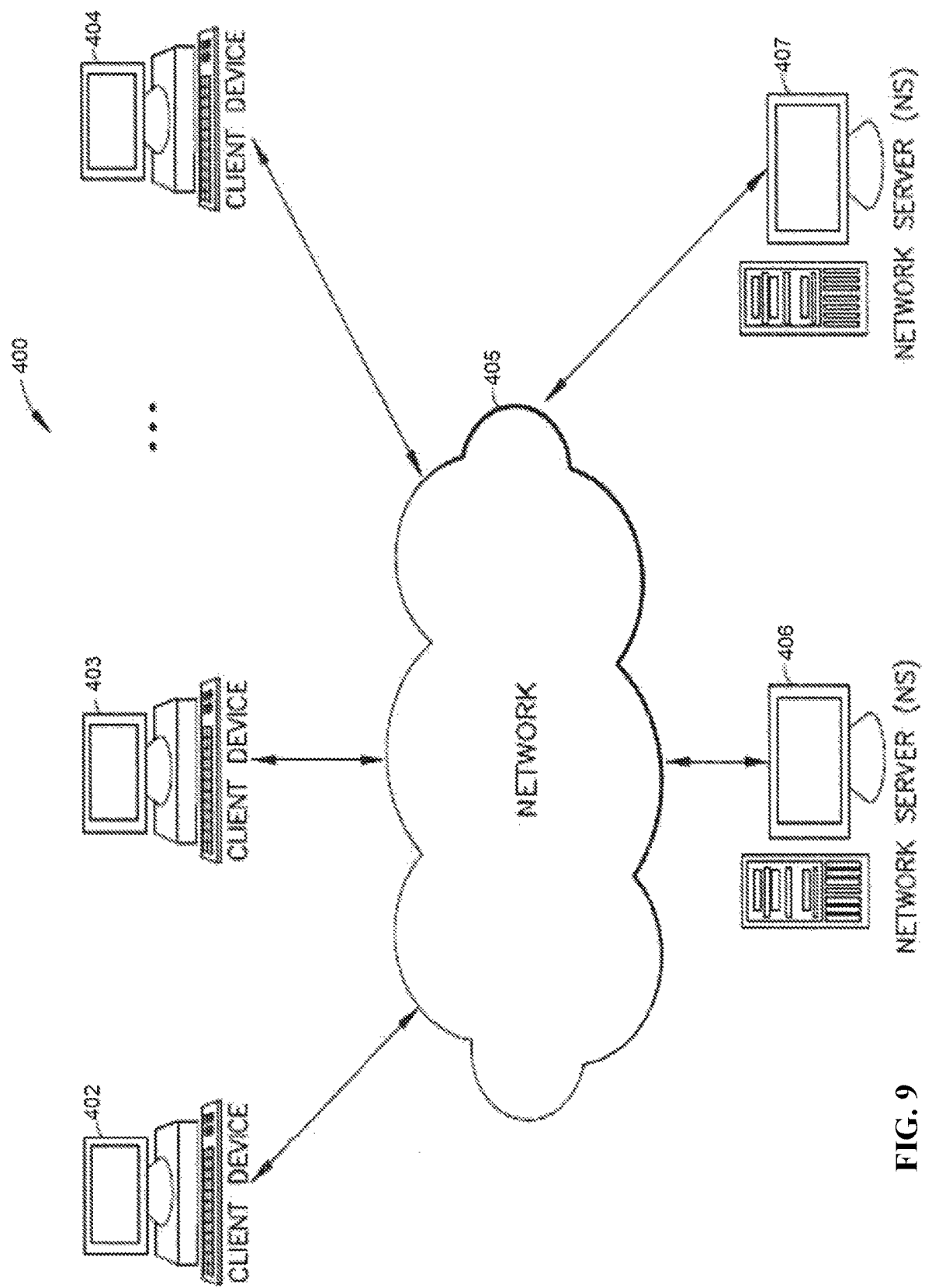
FIG. 9 depicts a block diagram of an exemplary computer-based system/platform in accordance with one or more embodiments of the present disclosure.

FIG. 9 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 9, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 10:
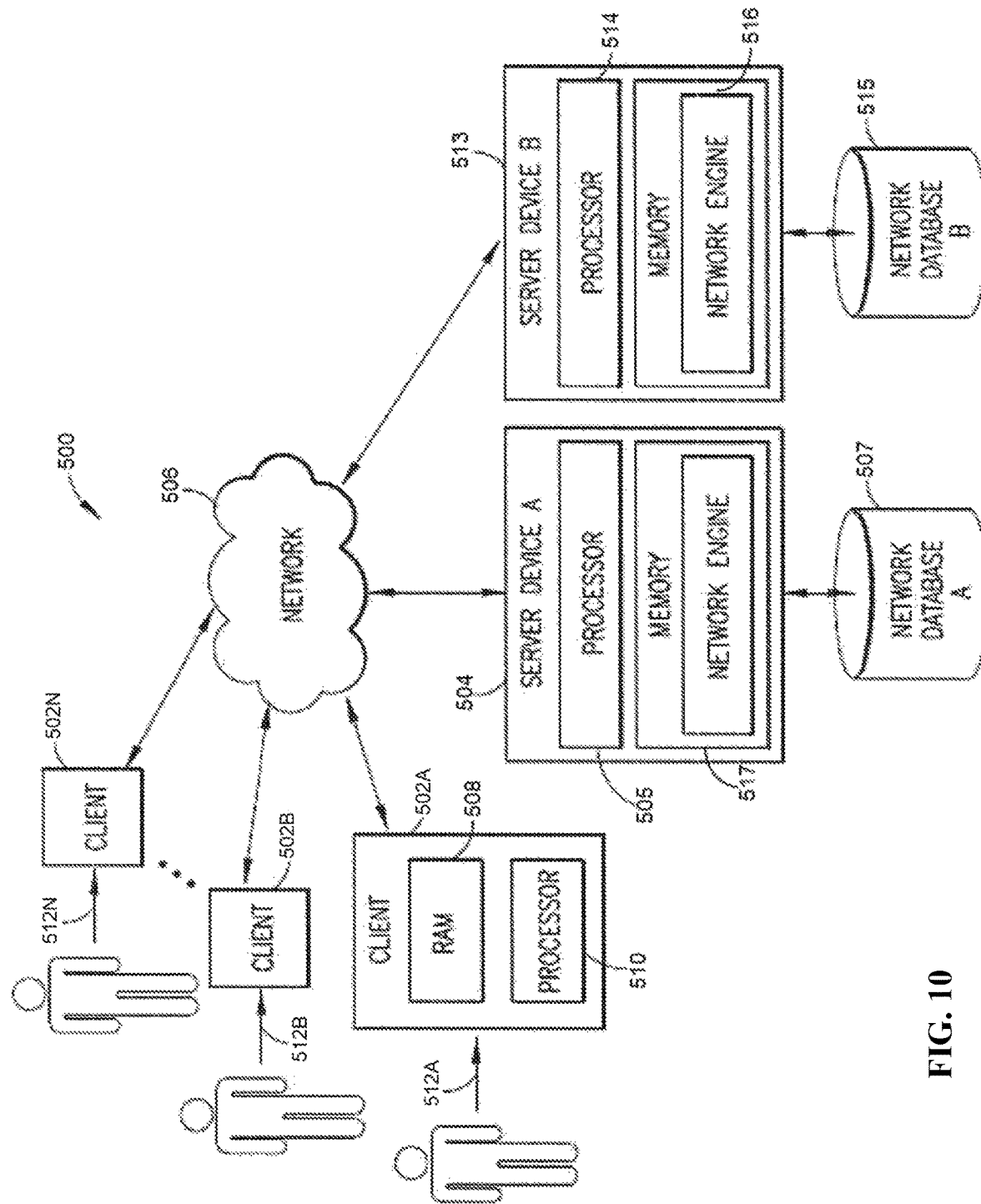
FIG. 10 depicts a block diagram of another exemplary computer-based system/platform in accordance with one or more embodiments of the present disclosure.

FIG. 10 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a-through 502n may also comprise a number of external or internal devices such as a mouse, a CD-ROM, DVD, a physical or virtual keyboard, a display, or other input or output devices. In some embodiments, examples of member computing devices 502a-through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a-through 502n may be specifically programmed with one or more application programs in accordance with one or more principles/methodologies detailed herein. In some embodiments, member computing devices 502a-through 502n may operate on any operating system capable of supporting a browser or browser-enabled application, such as Microsoft™ Windows™, and/or Linux. In some embodiments, member computing devices 502a-through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a-through 502n, users, 512a-through 512n, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502a-through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
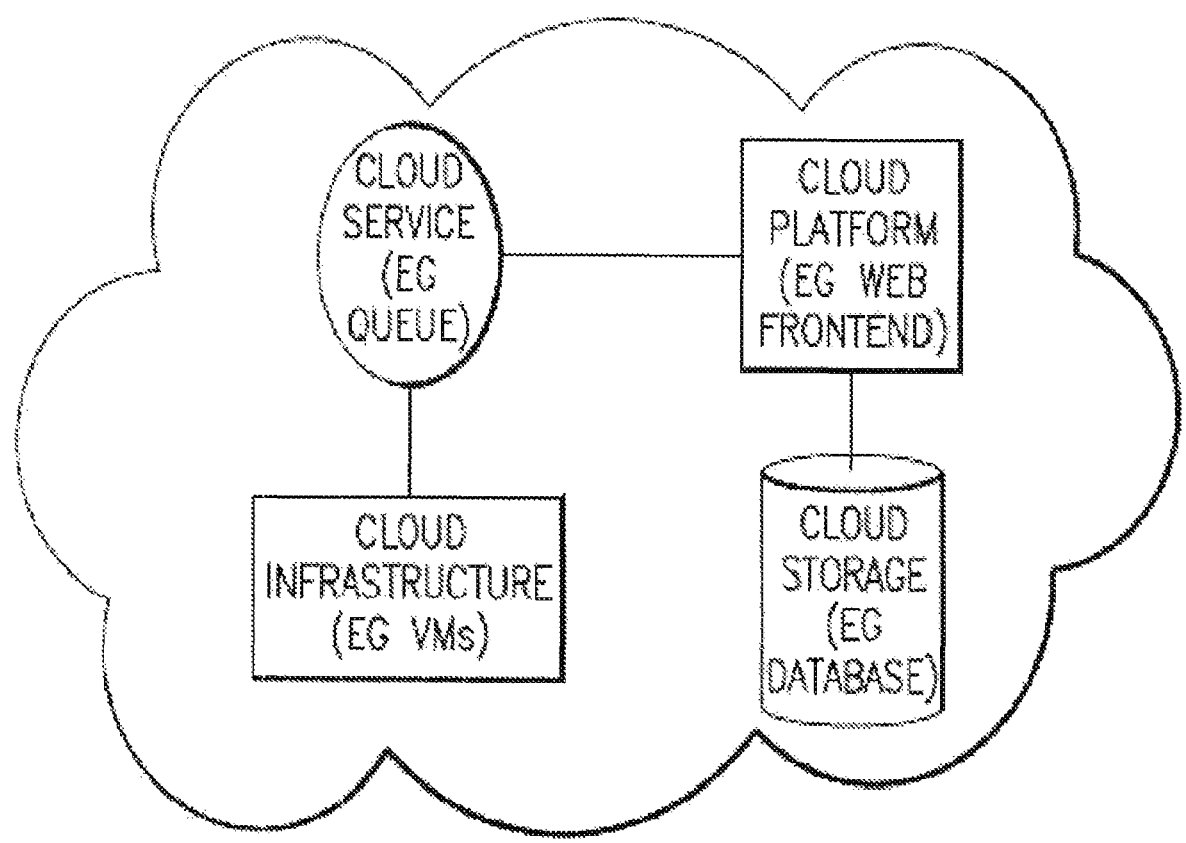
FIGS. 11 and 12 are diagrams illustrating implementations of cloud computing architecture/aspects with respect to which the disclosed technology may be specifically configured to operate, in accordance with one or more embodiments of the present disclosure.
Figure 12:
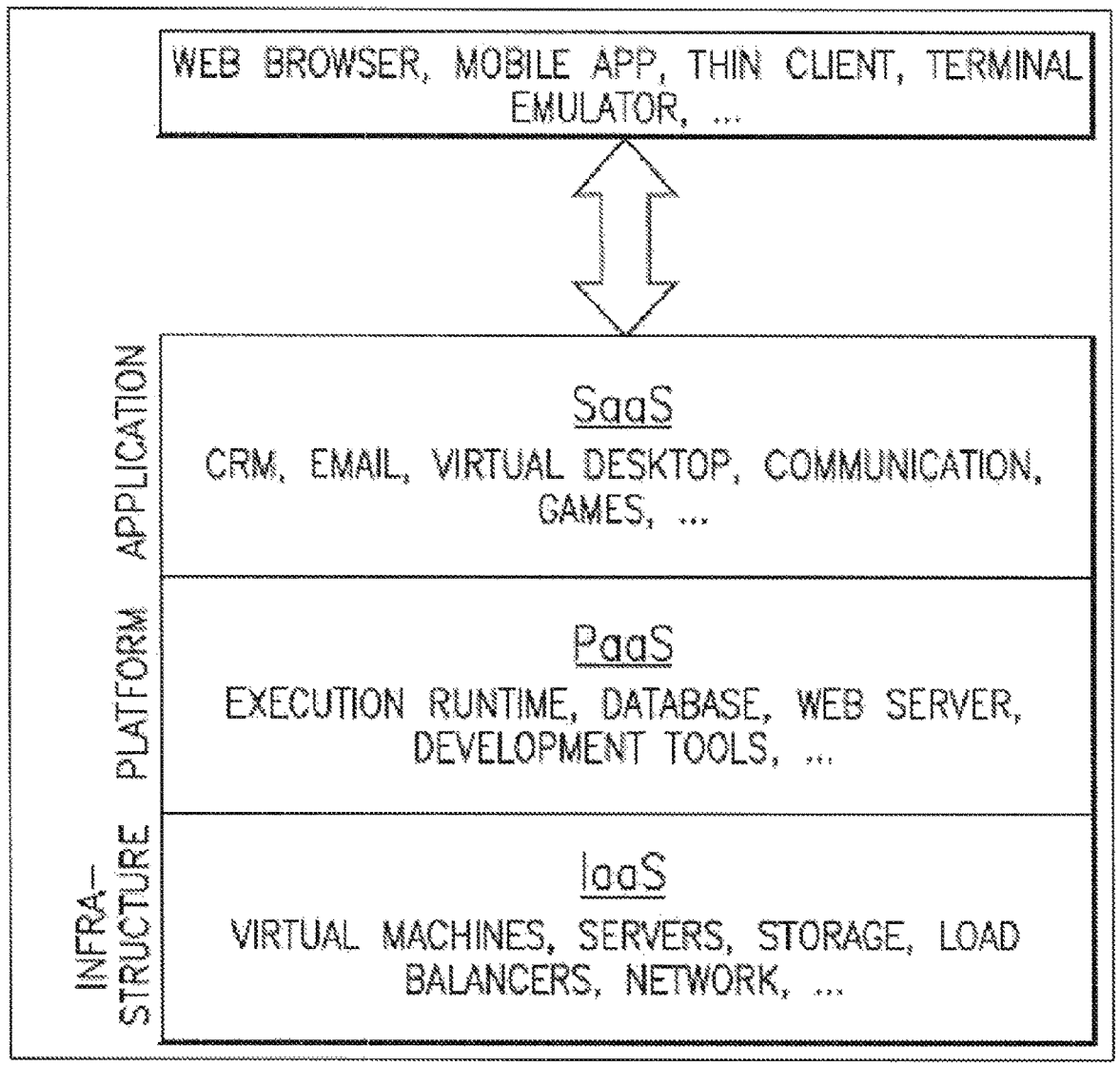

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 11 and 12 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a method may include:
receiving, by a processor, a document file of text;
separating, by the processor, the text in the document file into a plurality of phrases;
generating, by the processor, a plurality of embedding vectors in a textual embedding space by inputting the plurality of phrases into an embedding engine;
wherein each embedding vector in the plurality of embedding vectors in the textual embedding space may correspond respectively to a phrase in the plurality of phrases;
wherein each embedding vector in the plurality of embedding vectors in the textual embedding space may represent a location in the textual embedding space;
wherein the location in the textual embedding space may represent:
(i) at least one word in each corresponding phrase in the plurality of phrases, and
(ii) a discourse of each corresponding phrase in the plurality of phrases;
wherein the discourse may be based on the at least one word in each corresponding phrase in the plurality of phrases;
generating, by the processor, a mapping of each embedding vector in the plurality of embedding vectors in the textual embedding space with each corresponding phrase in the plurality of phrases and a document location of each corresponding phrase in the plurality of phrases in the text of the document file;
storing, by the processor, the mapping in an index in a non-transient memory;
receiving, by the processor, an input of a candidate phrase by a user;
generating, by the processor, a candidate embedding vector representing a candidate phrase location in the textual embedding space by inputting the candidate phrase into the embedding engine;
computing, by the processor, a plurality of embedding space distances between the candidate phrase location and each respective location of each embedding vector in the plurality of embedding vectors in the textual embedding space;
computing, by the processor, a plurality of similarity scores based on the plurality of embedding space distances;
ranking, by the processor, the plurality of similarity scores from a highest similarity score to a lowest similarity score; and
outputting, by the processor, a listing of phrases from the plurality of phrases with the highest similarity scores to the user with respective document locations in the text of the document file based on the mapping index.

In some embodiments, computing the plurality of similarity scores for each corresponding phrase in the plurality of phrases in the text of the document file may include assessing a similarity between the at least one word and discourse for each corresponding phrase in the plurality of phrases, and at least one word and discourse in the candidate phrase.

In some embodiments, separating the text in the document file into the plurality of phrases may include identifying a start and an end of a particular phrase in the plurality of phrases in the text using punctuation marks as delimiters.

In some embodiments, computing the distance may include computing the distance using coordinates of locations in the textual embedding space.

In some embodiments, the embedding model may be a bidirectional encoder representations from transformers (BERT) model, a convolutional neural network model, or a recurrent neural network model.

In some embodiments, the document location of each corresponding phrase in the plurality of phrases in the text of the document file in the index may include a sentence number.

In some embodiments, generating the plurality of embedding vectors in the textual embedding space may include applying a k-dimensional tree data structure or partitioning the textual embedding space into quadrants.

In some embodiments, generating the plurality of embedding vectors may include generating the plurality of embedding vectors using elements in the textual embedding space selected from the group consisting of: word embeddings associated with each of the at least one word in each corresponding phrase in the plurality of phrases, word vectors associated with each of the at least one word in each corresponding phrase in the plurality of phrases, weighted averages of word vectors, and a discourse vector capturing correlations between word vectors of the at least one word and the discourse in each corresponding phrase in the plurality of phrases.

In some embodiments, receiving the input of the candidate phrase by the user may include receiving the candidate phrase of the user through a graphic user interface.

In some embodiments, the method may further include:
displaying the text of the document file on a graphic user interface; and
highlighting the phrases from the plurality of phrases with the highest similarity scores in the text of the document file.

A system may include a non-transient memory and a processor. The processor may be configured to:
receive a document file of text;
separate the text in the document file into a plurality of phrases;
generate a plurality of embedding vectors in a textual embedding space by inputting the plurality of phrases into an embedding engine;
wherein each embedding vector in the plurality of embedding vectors in the textual embedding space may correspond respectively to a phrase in the plurality of phrases;
wherein each embedding vector in the plurality of embedding vectors in the textual embedding space may represent a location in the textual embedding space;
wherein the location in the textual embedding space may represent:
(i) at least one word in each corresponding phrase in the plurality of phrases, and
(ii) a discourse of each corresponding phrase in the plurality of phrases;
wherein the discourse may be based on the at least one word in each corresponding phrase in the plurality of phrases;
generate a mapping of each embedding vector in the plurality of embedding vectors in the textual embedding space with each corresponding phrase in the plurality of phrases and a document location of each corresponding phrase in the plurality of phrases in the text of the document file;
store the mapping in an index in the non-transient memory;
receive an input of a candidate phrase by a user;
generate a candidate phrase embedding vector representing a candidate phrase location in the textual embedding space by inputting the candidate phrase into the embedding engine;
compute a plurality of embedding space distances between the candidate phrase location and each respective location of each embedding vector in the plurality of embedding vectors in the textual embedding space;
compute a plurality of similarity scores based on the plurality of embedding space distances;
rank the plurality of similarity scores from a highest similarity score to a lowest similarity score; and
output a listing of phrases from the plurality of phrases with the highest similarity scores to the user with respective document locations in the text of the document file based on the mapping index.

In some embodiments, the processor may be configured to compute the plurality of similarity scores for each corresponding phrase in the plurality of phrases in the text of the document file by assessing a similarity between the at least one word and discourse for each corresponding phrase in the plurality of phrases, and at least one word and discourse in the candidate phrase.

In some embodiments, the processor may be configured to separate the text in the document file into the plurality of phrases by identifying a start and an end of a particular phrase in the plurality of phrases in the text using punctuation marks as delimiters.

In some embodiments, the processor may be configured to compute the distance by computing the distance using coordinates of locations in the textual embedding space.

In some embodiments, the embedding model may be a bidirectional encoder representations from transformers (BERT) model, a convolutional neural network model, or a recurrent neural network model.

In some embodiments, the document location of each corresponding phrase in the plurality of phrases in the text of the document file in the index may include a sentence number.

In some embodiments, the processor may be configured to generate the plurality of embedding vectors in the textual embedding space by applying a k-dimensional tree data structure or partitioning the textual embedding space into quadrants.

In some embodiments, the processor may be configured to generate the plurality of embedding vectors by generating the plurality of embedding vectors using elements in the textual embedding space selected from the group consisting of: word embeddings associated with each of the at least one word in each corresponding phrase in the plurality of phrases, word vectors associated with each of the at least one word in each corresponding phrase in the plurality of phrases, weighted averages of word vectors, and a discourse vector capturing correlations between word vectors of the at least one word and the discourse in each corresponding phrase in the plurality of phrases.

In some embodiments, the processor may be configured to receive the input of the candidate phrase by the user by receiving the candidate phrase of the user through a graphic user interface.

In some embodiments, the processor may be further configured to:
display the text of the document file on a graphic user interface; and
highlight the phrases from the plurality of phrases with the highest similarity scores in the text of the document file.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
   receiving, by a processor, a document file of text;
   separating, by the processor, the text in the document file into a plurality of phrases;
   generating, by the processor, a plurality of embedding vectors in a textual embedding space by inputting the plurality of phrases into an embedding engine;
   wherein each embedding vector in the plurality of embedding vectors in the textual embedding space corresponds respectively to a phrase in the plurality of phrases;
   wherein each embedding vector in the plurality of embedding vectors in the textual embedding space represents a location in the textual embedding space;
   wherein the location in the textual embedding space represents:
   (i) at least one word in each corresponding phrase in the plurality of phrases, and
   (ii) a discourse of each corresponding phrase in the plurality of phrases;
   wherein the discourse is based on the at least one word in each corresponding phrase in the plurality of phrases;
   generating, by the processor, a mapping of each embedding vector in the plurality of embedding vectors in the textual embedding space with each corresponding phrase in the plurality of phrases and a document location of each corresponding phrase in the plurality of phrases in the text of the document file;
   storing, by the processor, the mapping in an index in a non-transient memory;
   receiving, by the processor, an input of a candidate phrase by a user;
   generating, by the processor, a candidate embedding vector representing a candidate phrase location in the textual embedding space by inputting the candidate phrase into the embedding engine;
   computing, by the processor, a plurality of embedding space distances between the candidate phrase location and each respective location of each embedding vector in the plurality of embedding vectors in the textual embedding space;
   computing, by the processor, a plurality of similarity scores based on the plurality of embedding space distances;
   ranking, by the processor, the plurality of similarity scores from a highest similarity score to a lowest similarity score; and
   outputting, by the processor, a listing of phrases from the plurality of phrases with the highest similarity scores to the user with respective document locations in the text of the document file based on the mapping index.

2. The method according to claim 1, wherein computing the plurality of similarity scores for each corresponding phrase in the plurality of phrases in the text of the document file comprises assessing a similarity between the at least one word and discourse for each corresponding phrase in the plurality of phrases, and at least one word and discourse in the candidate phrase.

3. The method according to claim 1, separating the text in the document file into the plurality of phrases comprises identifying a start and an end of a particular phrase in the plurality of phrases in the text using punctuation marks as delimiters.

4. The method according to claim 1, computing the distance comprises computing the distance using coordinates of locations in the textual embedding space.

5. The method according to claim 1, wherein the embedding model is selected from the group consisting of a bidirectional encoder representations from transformers (BERT) model, a convolutional neural network model, and a recurrent neural network model.

6. The method according to claim 1, wherein the document location of each corresponding phrase in the plurality of phrases in the text of the document file in the index comprises a sentence number.

7. The method according to claim 1, wherein generating the plurality of embedding vectors in the textual embedding space comprises applying a k-dimensional tree data structure.

8. The method according to claim 1, wherein generating the plurality of embedding vectors comprises generating the plurality of embedding vectors using elements in the textual embedding space selected from the group consisting of: word embeddings associated with each of the at least one word in each corresponding phrase in the plurality of phrases, word vectors associated with each of the at least one word in each corresponding phrase in the plurality of phrases, weighted averages of word vectors, and a discourse vector capturing correlations between word vectors of the at least one word and the discourse in each corresponding phrase in the plurality of phrases.

9. The method according to claim 1, wherein receiving the input of the candidate phrase by the user comprises receiving the candidate phrase of the user through a graphic user interface.

10. The method according to claim 1, further comprising:
    displaying the text of the document file on a graphic user interface; and
    highlighting the phrases from the plurality of phrases with the highest similarity scores in the text of the document file.

11. A system, comprising:
    a non-transient memory; and
    a processor configured to:
    receive a document file of text;
    separate the text in the document file into a plurality of phrases;
    generate a plurality of embedding vectors in a textual embedding space by inputting the plurality of phrases into an embedding engine;
    wherein each embedding vector in the plurality of embedding vectors in the textual embedding space corresponds respectively to a phrase in the plurality of phrases;
    wherein each embedding vector in the plurality of embedding vectors in the textual embedding space represents a location in the textual embedding space;
    wherein the location in the textual embedding space represents:
    (i) at least one word in each corresponding phrase in the plurality of phrases, and
    (ii) a discourse of each corresponding phrase in the plurality of phrases;
    wherein the discourse is based on the at least one word in each corresponding phrase in the plurality of phrases;
    generate a mapping of each embedding vector in the plurality of embedding vectors in the textual embedding space with each corresponding phrase in the plurality of phrases and a document location of each corresponding phrase in the plurality of phrases in the text of the document file;

store the mapping in an index in the non-transient memory;

receive an input of a candidate phrase by a user;

generate a candidate phrase embedding vector representing a candidate phrase location in the textual embedding space by inputting the candidate phrase into the embedding engine;

compute a plurality of embedding space distances between the candidate phrase location and each respective location of each embedding vector in the plurality of embedding vectors in the textual embedding space;

compute a plurality of similarity scores based on the plurality of embedding space distances;

rank the plurality of similarity scores from a highest similarity score to a lowest similarity score; and output a listing of phrases from the plurality of phrases with the highest similarity scores to the user with respective document locations in the text of the document file based on the mapping index.

12. The system according to claim 11, wherein the processor is configured to compute the plurality of similarity scores for each corresponding phrase in the plurality of phrases in the text of the document file by assessing a similarity between the at least one word and discourse for each corresponding phrase in the plurality of phrases, and at least one word and discourse in the candidate phrase.

13. The system according to claim 11, wherein the processor is configured to separate the text in the document file into the plurality of phrases by identifying a start and an end of a particular phrase in the plurality of phrases in the text using punctuation marks as delimiters.

14. The system according to claim 11, wherein the processor is configured to compute the distance by computing the distance using coordinates of locations in the textual embedding space.

15. The system according to claim 11, wherein the embedding model is selected from the group consisting of a bidirectional encoder representations from transformers (BERT) model, a convolutional neural network model, and a recurrent neural network model.

16. The system according to claim 11, wherein the document location of each corresponding phrase in the plurality of phrases in the text of the document file in the index comprises a sentence number.

17. The system according to claim 11, wherein the processor is configured to generate the plurality of embedding vectors in the textual embedding space by applying a k-dimensional tree data structure.

18. The system according to claim 11, wherein the processor is configured to generate the plurality of embedding vectors by generating the plurality of embedding vectors using elements in the textual embedding space selected from the group consisting of: word embeddings associated with each of the at least one word in each corresponding phrase in the plurality of phrases, word vectors associated with each of the at least one word in each corresponding phrase in the plurality of phrases, weighted averages of word vectors, and a discourse vector capturing correlations between word vectors of the at least one word and the discourse in each corresponding phrase in the plurality of phrases.

19. The system according to claim 11, wherein the processor is configured to receive the input of the candidate phrase by the user by receiving the candidate phrase of the user through a graphic user interface.

20. The system according to claim 11, wherein the processor is further configured to:

display the text of the document file on a graphic user interface; and highlight the phrases from the plurality of phrases with the highest similarity scores in the text of the document file.

* * * * *